United States Patent [19]

Nonaka

[11] Patent Number: 5,475,103

[45] Date of Patent: * Dec. 12, 1995

[54] PROCESS FOR THE PRODUCTION OF HALOGENATED PHTHALOCYANINE

[75] Inventor: Yoshiyuki Nonaka, Tokyo, Japan

[73] Assignee: Toyo Ink Manufacturing Co., Ltd., Tokyo, Japan

[*] Notice: The portion of the term of this patent subsequent to Jun. 27, 2012, has been disclaimed.

[21] Appl. No.: 351,090

[22] Filed: Nov. 30, 1994

[30] Foreign Application Priority Data

Dec. 3, 1993 [JP] Japan ................................. 5-303978

[51] Int. Cl.⁶ ............................................... C09B 47/04
[52] U.S. Cl. ...................................................... 540/138
[58] Field of Search ................................. 540/138, 141

[56] References Cited

U.S. PATENT DOCUMENTS 4,948,884  8/1990  Nonaka et al. .................... 540/138
5,286,855  2/1994  Nonaka et al. .................... 540/138

*Primary Examiner*—Mukund J. Shah
*Assistant Examiner*—Pavanaram K. Sripada
*Attorney, Agent, or Firm*—Wenderoth, Lind & Ponack

[57] ABSTRACT

A process for the production of a halogenated phthalocyanine, in which a solvent can be easily recovered and the halogenated phthalocyanine has reduced residual metal amount, the process comprising forming a complex of aluminum chloride and phthalocyanine in sulfonyl chloride and then halogenating the phthalocyanine.

8 Claims, No Drawings

PROCESS FOR THE PRODUCTION OF HALOGENATED PHTHALOCYANINE

FIELD OF THE INVENTION

The present invention relates to a process for the production of halogenated phthalocyanine. More specifically, it relates to a process for the production of halogenated phthalocyanine, in which the amount of a residual metal can be decreased.

PRIOR ART OF THE INVENTION

Generally, phthalocyanine has been industrially halogenated by a method in which phthalocyanine is halogenated while it is dissolved in a eutectic salt of aluminum chloride and sodium chloride or a method in which phthalocyanine is halogenated while it is dissolved in chlorosulfonic acid. In these methods, however, it is industrially difficult to recover the solvent, and as a result, a large amount of an acidic effluent is caused. For environmental protection, the effluent should be treated, and a large cost is required for the treatment. As a halogenation method using a recoverable solvent in order to cope with the above problem, there have been disclosed methods using a metal chloride as a solvent. For example, JP-A-52-29819 and U.S. Pat. No. 4,948,884 disclose a method of halogenating phthalocyanine in a titanium tetrachloride as a solvent. Further, like titanium tetrachloride, tin tetrachloride can be used as a solvent, and other metal chlorides which are in a liquid state at room temperature can be also similarly used. However, the problem of these halogenation methods using a metal chloride as a solvent is that the above solvents leave a small amount of a metal in the pigment which is the end product, and it is technically very difficult to remove the residual metal.

SUMMARY OF THE INVENTION

It is an object of the present invention to provide a process for the production of a halogenated phthalocyanine, in which a solvent can be easily recovered.

It is another object of the present invention to provide a process for the production of a halogenated phthalocyanine of which the residual metal amount is decreased.

According to the present invention, the above objects and advantages can be achieved by a process for the production of a halogenated phthalocyanine, comprising forming a complex of aluminum chloride and phthalocyanine in sulfonyl chloride and then halogenating the phthalocyanine.

DETAILED DESCRIPTION OF THE INVENTION

The phthalocyanine used in the present invention is generally an unhalogenated copper phthalocyanine, while it may be any one of a metal-free phthalocyanine, a phthalocyanine whose central metal is a metal selected from Al, Ti, V, Fe, Co, Ni, Zn, Ge, Mo and Sn, and a mixture of these phthalocyanines. Further, the phthalocyanine used in the present invention may be a partially halogenated phthalocyanine.

In the present invention, the amount of the sulfonyl chloride is at least 4 times, preferably 5 to 20 times, more preferably 8 to 15 times, as large as the weight of the phthalocyanine. When the amount of the sulfonyl chloride is less than 4 times, the state of a stirred reactant is defective. When it exceeds 20 times, it is disadvantageous in economic performance.

In the present invention, the formation of a complex of the phthalocyanine and aluminum chloride involves physical changes caused by co-melting, addition and/or formation of a salt due to mutual actions of these two components. In the process of the complex formation, it is found by X-ray diffractometry that the crystallizability of the phthalocyanine markedly decreases. Further, the formation of the complex can be sometimes found by the following characteristic optical changes: The reflection spectrum of the phthalocyanine shifts to a long wavelength side, or a remarkably brownish bronze color is observed.

In the present invention, for example, the complex of the phthalocyanine and aluminum chloride can be rapidly formed by a method in which the phthalocyanine and aluminum chloride are brought into contact with each other under heat. That is, the phthalocyanine and aluminum chloride are preliminary stirred in the sulfonyl chloride under heat. The preliminary stirring is carried out at a temperature of 80° to 250° C., preferably 120° to 200° C. The halogenation is also preferably carried out under similar temperature conditions. For obtaining an intended temperature, the preliminary stirring or the halogenation may be carried out under atmospheric pressure or elevated pressure. The complex of the phthalocyanine and aluminum chloride may be formed by the application of some energy other than heat, and then, the halogenation may be carried out while adding additional aluminum chloride as required.

The method of adding aluminum chloride is important for keeping the reaction system stable. That is, for stably maintaining the reaction system and for smoothly proceeding with the halogenation, it is important to form the complex of the phthalocyanine and aluminum chloride before the halogenation. Further, for sufficiently proceeding with the halogenation, the aluminum chloride is required in an amount of at least 3 mol per mole of the phthalocyanine. When aluminum chloride ("initial aluminum chloride" hereinafter) is added before the formation of the complex and additional aluminum chloride is added before and/or during the halogenation, the amount of the initial aluminum chloride per mole of the phthalocyanine is 0.4 to 4 mol, and the total amount of aluminum chloride (initial aluminum chloride + additional aluminum chloride) per mole of the phthalocyanine is 3 to 10 mol, preferably 4 to 8 mol.

The halogen is selected from chlorine and bromine. When bromine is used, a phthalocyanine green with a highly yellowish shade can be obtained.

EXAMPLES

The present invention will be further detailed hereinafter with reference to Examples, in which "part" stands for "part by weight", and "%" stands for "% by weight".

Example 1

A reactor of glass for a pressure test, having a high-strength mechanical stirrer, a cooling tube switchable to reflux and distilling off, a thermometer and a gas-introducing tube, was charged with 500 parts of sulfonyl chloride, 40 parts of a crude copper phthalocyanine and 35 parts of aluminum chloride, and while the mixture was stirred, the pressure in the reactor was increased and the temperature in the reactor was increased up to 120° C. While the temperature was maintained at 120° C.±5°C., the mixture was continuously stirred for 8 hours. Then, a chlorine gas was introduced at a rate of 5 parts/hour for 15 hours. 5 Parts of aluminum chloride was added, and a chlorine gas was further introduced at a rate of 5 parts/hour for 10 hours. The sulfonyl chloride was distilled off, 2,000 parts of water was added to the remaining reaction product, and the mixture was taken out as a slurry. The slurry was filtered, washed with water, washed with an alkali, filtered, and dried to give 70 parts of a green, chlorinated copper phthalocyanine. This phthalocyanine was measured for a chlorine content to show 15.6 chlorine atoms introduced per copper phthalocyanine molecule.

EXAMPLE 2

The same reactor as that used in Example 1 was charged with 650 parts of sulfonyl chloride, 40 parts of a crude aluminum phthalocyanine and 40 parts of aluminum chloride, and while the mixture was stirred, the pressure in the reactor was increased and the temperature in the reactor was increased up to 120° C. While the temperature was maintained at 120° C.±5° C., the mixture was continuously stirred for 6 hours. Then, a chlorine gas was introduced at a rate of 5 parts/hour for 25 hours. The sulfonyl chloride was distilled off, 2,000 parts of water was added to the remaining reaction product, and the mixture was taken out as a slurry. The slurry was filtered, washed with water, washed with an alkali, filtered, and dried to give 70 parts of a green, chlorinated aluminum phthalocyanine. This phthalocyanine was measured for a chlorine content to show 15.5 chlorine atoms introduced per aluminum phthalocyanine molecule.

Example 3

The same reactor as that used in Example 1 was charged with 500 parts of sulfonyl chloride, 40 parts of a crude copper phthalocyanine and 40 parts of aluminum chloride, and while the mixture was stirred, the pressure in the reactor was increased and the temperature in the reactor was increased up to 140° C. While the temperature was maintained at 140° C.±5° C., the mixture was continuously stirred for 6 hours. Then, a chlorine gas was introduced at a rate of 5 parts/hour for 25 hours. The sulfonyl chloride was distilled off, 2,000. parts of water was added to the remaining reaction product, and the mixture was taken out as a slurry. The slurry was filtered, washed with water, washed with an alkali, filtered, and dried to give 70 parts of a green, chlorinated copper phthalocyanine. This phthalocyanine was measured for a chlorine content to show 15.6 chlorine atoms introduced per copper phthalocyanine molecule.

Example 4

The same reactor as that used in Example 1 was charged with 500 parts of sulfonyl chloride, 40 parts of a crude iron phthalocyanine and 40 parts of aluminum chloride, and while the mixture was stirred, the pressure in the reactor was increased and the temperature in the reactor was increased lip to 180° C. While the temperature was maintained at 180° C.±5° C., the mixture was continuously stirred for 8 hours. Then, a chlorine gas was introduced at a rate of 5 parts/hour for 25 hours. The sulfonyl chloride was distilled off, 2,000 parts of water was added to the remaining reaction product, and the mixture was taken out as a slurry. The slurry was filtered, washed with water, washed with an alkali, filtered, and dried to give 70 parts of a green, chlorinated iron phthalocyanine. This phthalocyanine was measured for a chlorine content to show 15.6 chlorine atoms introduced per iron phthalocyanine molecule.

Example 5

The same reactor as that used in Example 1 was charged with 400 parts of sulfonyl chloride, 40 parts of a crude tin phthalocyanine and 35 parts of aluminum chloride, and while the mixture was stirred, the pressure in the reactor was increased and the temperature in the reactor was increased up to 160° C. While the temperature was maintained at 160° C.±5° C., the mixture was continuously stirred for 10 hours. Then, a chlorine gas was introduced at a rate of 5 parts/hour for 15 hours. 5 Parts of aluminum chloride was added, and a chlorine gas was further introduced at a rate of 5 parts/hour for 10 hours. The sulfonyl chloride was distilled off, 2,000 parts of water was added to the remaining reaction product, and the mixture was taken out as a slurry. The slurry was filtered, washed with water, washed with an alkali, filtered, and dried to give 70 parts of a green, chlorinated tin phthalocyanine. This phthalocyanine was measured for a chlorine content to show 15.7 chlorine atoms introduced per tin phthalocyanine molecule.

Example 6

The same reactor as that used in Example 1 was charged with 600 parts of sulfonyl chloride, 40 parts of a crude copper phthalocyanine and 40 parts of aluminum chloride, and while the mixture was stirred, the pressure in the reactor was increased and the temperature in the reactor was increased up to 120° C. While the temperature was maintained at 120° C.±5° C., the mixture was continuously stirred for 8 hours. Then, bromine was introduced at a rate of 5 parts/hour for 35 hours. The sulfonyl chloride was distilled off, 2,000 parts of water was added to the remaining reaction product, and the mixture was taken out as a slurry. The slurry was filtered, washed with water, washed with an alkali, filtered, and dried to give 90 parts of a green, brominated copper phthalocyanine. This phthalocyanine was measured for a bromine content to show 14.8 bromine atoms introduced per copper phthalocyanine molecule.

Example 7

The same reactor as that used in Example 1 was charged with 500 parts of sulfonyl chloride, 40 parts of a crude aluminum phthalocyanine and 40 parts of aluminum chloride, and while the mixture was stirred, the pressure in the reactor was increased and the temperature in the reactor was increased up to 140° C. While the temperature was maintained at 140° C.±5° C., the mixture was continuously stirred for 8 hours. Then, bromine was introduced at a rate of 5 parts/hour for 35 hours. The sulfonyl chloride was distilled off, 2,000 parts of water was added to the remaining reaction product, and the mixture was taken out as a slurry. The slurry was filtered, washed with water, washed with an alkali, filtered, and dried to give 90 parts of a green, brominated aluminum phthalocyanine. This phthalocyanine was measured for a bromine content to show 15.2 bromine atoms introduced per aluminum phthalocyanine molecule.

Comparative Example 1

A reactor was charged with 600 parts of titanium tetrachloride, 40 parts of a crude copper phthalocyanine and 40 parts of aluminum chloride, and the temperature in the reactor was increased with stirring. When the temperature reached 137° C., the mixture was preliminarily stirred for 6 hours. Then, a chlorine gas was introduced at a rate of 5 parts/hour for 25 hours. After the reaction, the titanium tetrachloride was distilled off, and 200 parts of 7% hydrochloric acid was added to the remainder, to give 70 parts of a green, chlorinated copper phthalocyanine. This phthalocyanine was measured for a chlorine content to show 15.7 chlorine atoms introduced per copper phthalocyanine molecule.

Comparative Example 2

A reactor was charged with 600 parts of titanium tetrachloride, 40 parts of a crude iron phthalocyanine and 40 parts of aluminum chloride, and the temperature in the reactor was increased with stirring. When the temperature reached 137° C., the mixture was preliminarily stirred for 8 hours. Then, a chlorine gas was introduced at a rate of 5 parts/hour for 25 hours to give 70 parts of a green, chlorinated iron phthalocyanine. This phthalocyanine was measured for a chlorine content to show 15.3 chlorine atoms introduced per iron phthalocyanine molecule.

Comparative Example 3

A reactor was charged with 600 parts of tin tetrachloride, 40 parts of a crude aluminum phthalocyanine and 40 parts of aluminum chloride, and the temperature in the reactor was increased with stirring. When the temperature reached 114° C., the mixture was preliminarily stirred for 10 hours. Then, a chlorine gas was introduced at a rate of 5 parts/hour for 35 hours to give 70 parts of a green, chlorinated aluminum phthalocyanine. This phthalocyanine was measured for a chlorine content to show 14.2 chlorine atoms introduced per aluminum phthalocyanine molecule.

(Quantitative Determination of residual metal amount)

The polyhalogenated phthalocyanines obtained in Examples 1 to 7 and Comparative Examples 1 to 3 were separately weighed to prepare samples in an exact amount of 5 parts each. Each of the samples was decomposed with 95 sulfuric acid and 68% nitric acid under heat, and 68% nitric acid and perchloric acid were further added to each of the decomposed samples. The resultant samples were respectively decomposed under heat, diluted to a constant volume and quantitatively measured for a residual metal amount by atomic absorption analysis. Table 1 shows the results.

TABLE 1

|  | Al | Ti | Sn |
| --- | --- | --- | --- |
| Example 1 | 0.4% | ND | ND |
| Example 2 | * | ND | ND |
| Example 3 | 0.4% | ND | ND |
| Example 4 | 0.4% | ND | ND |
| Example 5 | 0.4% | ND | * |
| Example 6 | 0.4% | ND | ND |
| Example 7 | * | ND | ND |
| Comparative Example 1 | 0.4% | 0.6% | ND |
| Comparative Example 2 | 0.4% | 0.6% | ND |
| Comparative Example 3 | * | ND | 0.8% |

*Not measured since the pigment had the metal to be measured, as a central metal.
ND = Not detected

What is claimed is:

1. A process for the production of a halogenated phthalocyanine, comprising forming a complex of aluminum chloride and phthalocyanine in sulfonyl chloride and then halogenating the phthalocyanine.

2. A process according to claim 1, wherein additional aluminum chloride is added for halogenating the phthalocyanine.

3. A process according to claim 1, wherein the sulfonyl chloride is used in an amount of at least 4 times as large as the weight of the phthalocyanine.

4. A process according to claim 1, wherein the complex of aluminum chloride and phthalocyanine is formed by preliminarily stirring the aluminum chloride and the phthalocyanine in the presence of the sulfonyl chloride at a temperature in the range of from 80° to 250° C.

5. A process according to claim 1, wherein the complex is formed by adding the aluminum chloride in an amount of 0.4 to 4 mol per mole of the phthalocyanine.

6. A process according to claim 2, wherein the total amount of the aluminum chloride for forming the complex and the aluminum chloride for the halogenation is 3 to 10 mol per mole of the phthalocyanine.

7. A process according to claim 1, wherein the phthalocyanine is a phthalocyanine having no central metal, or a phthalocyanine having, as a central metal, a metal selected from Al, Ti, V, Fe, Co, Ni, Zn, Ge, Mo and Sn.

8. A process according to claim 1, wherein the halogenation is chlorination or bromination.

* * * * *